US008989925B2

(12) United States Patent
Strickling

(10) Patent No.: US 8,989,925 B2
(45) Date of Patent: Mar. 24, 2015

(54) METHOD AND APPARATUS FOR CONVERSION OF GPS HEADING DATA FOR USE BY ELECTRONIC FLIGHT DIRECTOR

(71) Applicant: James Eugene Strickling, Suwanee, GA (US)

(72) Inventor: James Eugene Strickling, Suwanee, GA (US)

(73) Assignee: L-3 Communications Corporation, New York, NY (US)

( * ) Notice: Subject to any disclaimer, the term of this patent is extended or adjusted under 35 U.S.C. 154(b) by 0 days.

(21) Appl. No.: 13/796,363

(22) Filed: Mar. 12, 2013

(65) Prior Publication Data
US 2013/0245859 A1 Sep. 19, 2013

Related U.S. Application Data

(60) Provisional application No. 61/612,760, filed on Mar. 19, 2012.

(51) Int. Cl.
*G05D 1/00* (2006.01)
*B64C 19/00* (2006.01)
*G01C 23/00* (2006.01)

(52) U.S. Cl.
CPC ............. *B64C 19/00* (2013.01); *G01C 23/005* (2013.01); *G05D 1/00* (2013.01)
USPC ........ 701/11; 701/3; 701/4; 701/14; 244/164; 244/76 R; 244/175; 244/179

(58) Field of Classification Search
CPC ........ B64C 13/00; B64C 15/00; B64C 19/00; G01C 23/005; G05D 1/00; G05D 1/08; G05D 1/0808

USPC ................... 701/1, 3–18, 120–122, 400, 408; 244/164, 75.1, 76 R, 175, 179–184, 244/190, 191, 195, 196, 220, 221
See application file for complete search history.

(56) References Cited

U.S. PATENT DOCUMENTS

| | | | | |
|---|---|---|---|---|
| 3,848,833 A | * | 11/1974 | Rauschelbach | ............... 244/177 |
| 3,980,258 A | * | 9/1976 | Simeon | ......................... 244/182 |
| 3,998,412 A | * | 12/1976 | Baker et al. | .................... 244/189 |
| 4,534,000 A | | 8/1985 | Bliss | |
| 4,646,244 A | * | 2/1987 | Bateman et al. | .............. 701/301 |
| 4,999,782 A | * | 3/1991 | BeVan | .......................... 701/466 |
| 5,008,825 A | * | 4/1991 | Nadkarni et al. | ................. 701/4 |

(Continued)

OTHER PUBLICATIONS

European Patent Office, European Search Report relating to EP application No. 13159396.4; Document Date Sep. 13, 2013; 7 pages.

*Primary Examiner* — Thomas Tarcza
*Assistant Examiner* — Tyler J Lee
(74) *Attorney, Agent, or Firm* — Gardner Groff Greenwald & Villanueva, P.C.

(57) ABSTRACT

An improved Horizontal Situation Indicator (HSI) module for use with an aircraft, wherein the HSI module is adapted for accepting Bank Angle Commands or waypoint data from the GPS flight module and for using the same to determine a heading error. The HSI module is further adapted for outputting the heading error to the Flight Director module where it can be used to create a Roll Command for output to the Auto-Pilot, whereby the Auto-Pilot can be commanded to follow a turn using the HSI and the Flight Director without requiring an additional module be added to the aircraft to create the heading error for use by the Flight Director. The waypoint data can be of the "flyover" type or the "flyby" type.

14 Claims, 1 Drawing Sheet

(56) References Cited

U.S. PATENT DOCUMENTS

| | | | | |
|---|---|---|---|---|
| 5,050,086 A | * | 9/1991 | Lambregts | 701/4 |
| 6,057,786 A | * | 5/2000 | Briffe et al. | 340/975 |
| 8,085,168 B2 | * | 12/2011 | Bethel | 340/971 |
| 2007/0233331 A1 | * | 10/2007 | Caillaud | 701/3 |
| 2012/0209455 A1 | * | 8/2012 | Warkomski | 701/3 |

\* cited by examiner

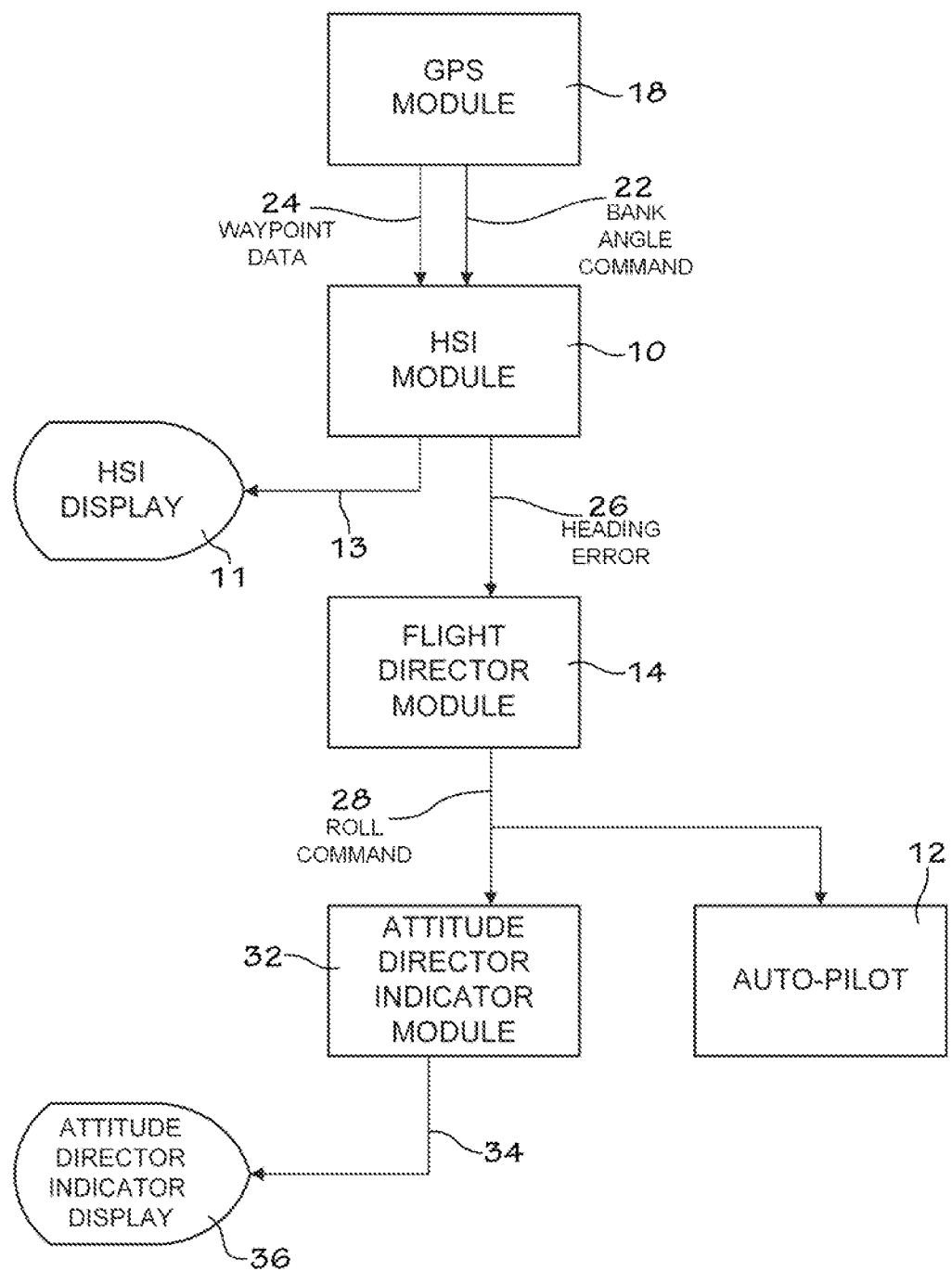

METHOD AND APPARATUS FOR CONVERSION OF GPS HEADING DATA FOR USE BY ELECTRONIC FLIGHT DIRECTOR

CROSS-REFERENCE TO RELATED APPLICATION

This application claims the priority benefit of U.S. Provisional Patent Application 61/612,760 filed on Mar. 19, 2012.

TECHNICAL FIELD

The present invention relates generally to electronic display guidance indicators, and more particularly, to HSI module that can calculate a heading error for commanding an Auto Pilot.

BACKGROUND

Electronic flight indicators are required on most aircraft, to inform the pilot and, if applicable, the co-pilot of the aircraft, of various information to assist in flying the aircraft. Military aircraft, commercial aircraft and even personally owned airplanes include electronic flight indicators in the instrument panels of the aircraft. Two common electronic flight indicators are: a horizontal situation indicator ("HSI"): and, an attitude direction indicator ("ADI").

Most military and commercial aircraft of today have a standard aircraft instrument panel dimension for each flight indicator. This is sometimes referred to as an ARINC cutout. In certain aircraft the ARINC cutout for an ADI or HSI has already been predetermined by industry standards. Thus, it can be problematic to add an additional hardware unit in many aircraft.

Known flight indicators have maintained one function for each indicator unit. For example, an HSI unit has been known to be a unique display indicator in comparison to an ADI unit. Due to the complexity involved in generating a particular display on the viewing screen of such a unit, known display indicators have been limited to just one type of display. Thus, these types of instruments have been special, single-purpose units. Therefore, HSI units have been separate from ADI units which also have been separate from radar units, etc.

Many modern aircraft also include a GPS (Global Positioning Satellite) system or module which can provide accurate information about the position of the aircraft and also can be useful in planning or plotting a course. It would be beneficial if there were a device or method for utilizing the information in/from the GPS module to command the Auto Pilot without requiring that another piece of hardware be added to the already-crowded cockpit. It is to the provision of solutions to this and other problems that the present invention is primarily directed.

SUMMARY

Generally described, the present invention relates to an improved Horizontal Situation Indicator (HSI) module for use with an aircraft of the type having an Auto-Pilot, a Flight Director module and display, and a GPS flight module which outputs Bank Angle Commands and/or waypoint data. The improved HSI module is adapted for accepting Bank Angle Commands or waypoint data from the GPS flight module and for using the same to determine a heading error. The HSI module is further adapted for outputting the heading error to the Flight Director module where it can be used to create a Roll Command for output to the Auto-Pilot, whereby the Auto-Pilot can be commanded to follow a turn using the HSI and the Flight Director without requiring an additional module be added to the aircraft to create the heading error for use by the Flight Director.

In one form, the Horizontal Situation Indicator (HSI) module uses Bank Angle Commands to determine the heading error. In another form, the Horizontal Situation Indicator (HSI) module uses waypoint data to determine the heading error. The waypoint data can be of the "flyover" type or the "flyby" type.

Advantageously, this invention permits the instrument to command the Auto-Pilot to make turns as needed without requiring another hardware item be added to the cockpit. Instead, an HSI module of this type can be provided and used in the above manner to command the Auto-Pilot. Since many aircraft have or are required to have an HSI module, no additional hardware needs to be added to the already crowded cockpit. Moreover, this invention can be provided as a new instrument when the aircraft is manufactured, can be provided as a new instrument to replace the existing HSI module in an aircraft, or can be implemented as a refurbishment of the existing HSI module.

In yet another form, the present invention relates to a method for use with an aircraft having an Auto-Pilot, a Horizontal Situation Indicator (HSI) module, a Flight Director module and display, and a GPS flight module which outputs a Bank Angle Command and/or waypoint data. The method includes the steps of: a. the HSI module accepting a Bank Angle Command and/or waypoint data from the GPS flight module; b. the HSI module using the Bank Angle Command and/or waypoint data to determine a heading error; c. the HSI module outputting the heading error to the Flight Director module; d. the Flight Director module creating a Roll Command from the heading error; and e. the Flight Director Module outputting the Roll Command to the Auto-Pilot.

Preferably, the aircraft also has an Attitude Director Indicator and the method further includes outputting the Roll Command from the Flight Director to the Attitude Director Indicator. In one form, the Horizontal Situation Indicator (HSI) module uses Bank Angle Commands to determine the heading error. In another form, the Horizontal Situation Indicator (HSI) module uses waypoint data to determine the heading error. The waypoint data can be of the "flyover" type or the "flyby" type.

Optionally, the method further includes outputting the Heading Error to the Flight Director display. Preferably, the Heading Error outputted to the Flight Director display is outputted by the Flight Director module.

BRIEF DESCRIPTION OF THE DRAWING FIGURES

FIG. 1 is a schematic representation of an improved Horizontal Situation Indicator (HSI) module for use with an aircraft of the type having an Auto-Pilot, a Flight Director module and display, and a GPS flight module, according to an example form of the present invention.

DESCRIPTION OF EXAMPLE EMBODIMENTS

As shown in FIG. 1, the present invention relates to an improved Horizontal Situation Indicator (HSI) module 10 for use with an aircraft of the type having an Auto-Pilot 12, a Flight Director module 14 (which may or may not have an associated dedicated display), and a GPS flight module 18 which outputs Bank Angle Commands 22 and/or waypoint data 24 as appropriate. The improved HSI module 10 is adapted for accepting Bank Angle Commands 22 and/or waypoint data 24 from the GPS flight module 18 and for using the same to determine a heading error 26. The HSI module is further adapted for outputting the heading error 26 to the Flight Director module 14 where it can be used to create a Roll Command 28 for output to the Auto-Pilot 12, whereby the Auto-Pilot 12 can be commanded to follow a turn using the HSI 10 and the Flight Director 14 without requiring an additional module be added to the aircraft to create the heading error for use by the Flight Director 14.

The HSI module 10 also outputs information 13 to HSI display 11, upon which the information 13 is displayed for viewing by the pilot or other personnel.

The Roll Command 28 is also outputted to Attitude Director Indicator module (ADI) 32, which in turn outputs information 34 to ADI display 36.

In one form, the Horizontal Situation Indicator (HSI) module 10 uses Bank Angle Commands 22 to determine the heading error 26. In another form, the Horizontal Situation Indicator (HSI) module 10 uses waypoint data 24 to determine the heading error. The waypoint data can be of the "flyover" type or the "flyby" type.

Advantageously, this invention permits the instrument 10 to command the Auto-Pilot 12 to make turns as needed without requiring another hardware item be added to the cockpit. Instead, an HSI module of this type can be provided and used in the above manner to command the Auto-Pilot 12.

In yet another form, the present invention relates to a method for use with an aircraft having an Auto-Pilot, a Horizontal Situation Indicator (HSI) module, a Flight Director module and display, and a GPS flight module which outputs a Bank Angle Command and/or waypoint data as appropriate. The method includes the steps of:
 a. the HSI module accepting a Bank Angle Command and/or waypoint data from the GPS flight module;
 b. the HSI module using the Bank Angle Command and/or waypoint data to determine a heading error;
 c. the HSI module outputting the heading error to the Flight Director module;
 d. the Flight Director module creating a Roll Command from the heading error; and
 e. the Flight Director Module outputting the Roll Command to the Auto-Pilot.

Preferably, the aircraft also has an Attitude Director Indicator and the method further includes outputting the Roll Command from the Flight Director to the Attitude Director Indicator. In one form, the Horizontal Situation Indicator (HSI) module uses Bank Angle Commands to determine the heading error. In another form, the Horizontal Situation Indicator (HSI) module uses waypoint data to determine the heading error. The waypoint data can be of the "flyover" type or the "flyby" type.

Optionally, the method further includes outputting the Heading Error to the Flight Director display. Preferably, the Heading Error outputted to the Flight Director display is outputted by the Flight Director module.

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

What is claimed is:

1. A method for controlling an aircraft having an Auto-Pilot, a Horizontal Situation Indicator (HSI) module, a Flight Director module and display, and a GPS flight module which outputs a Bank Angle Command and/or waypoint data, the method comprising the steps of:
 a. the HSI module accepting a Bank Angle Command and/or waypoint data from the GPS flight module;
 b. the HSI module using the Bank Angle Command and/or waypoint data to determine a heading error;
 c. the HSI module outputting the heading error to the Flight Director module;
 d. the Flight Director module creating a Roll Command from the heading error; and
 e. the Flight Director Module outputting the Roll Command to the Auto-Pilot.

2. The method as claimed in claim 1 wherein the aircraft also has an Attitude Director Indicator, the method further comprising outputting the Roll Command from the Flight Director to the Attitude Director Indicator.

3. The method as claimed in claim 1 further comprising outputting the Heading Error to the Flight Director display.

4. The method as claimed in claim 3 wherein the Heading Error outputted to the Flight Director display is outputted by the Flight Director module.

5. The method as claimed in claim 1 wherein a Bank Angle Command is generated by the aircraft's GPS Flight module and the HSI module uses the Bank Angle Command to determine the heading error.

6. The method as claimed in claim 1 wherein waypoint data is generated by the aircraft's GPS Flight module and the HSI module uses the waypoint data to determine the heading error.

7. The method as claimed in claim 6 wherein the waypoint data includes flyby waypoint data.

8. The method as claimed in claim 6 wherein the waypoint data includes flyover waypoint data.

9. An improved Horizontal Situation Indicator (HSI) module for use with an aircraft of the type having an Auto-Pilot, a Flight Director module and display, and a GPS flight module which outputs a Bank Angle Command and/or waypoint data, the improvement in the HSI module comprising:
 the HSI module being configured for accepting a Bank Angle Command and/or waypoint data from the GPS flight module and for using the Bank Angle Command and/or waypoint data to determine a heading error, and wherein the HSI module is further configured for outputting the heading error to the Flight Director module where it can be used to create a Roll Command for output to the Auto-Pilot, whereby the Auto-Pilot can be commanded to follow a turn using the HSI and the Flight Director without requiring an additional module be added to the aircraft to create the heading error for use by the Flight Director.

10. The improved Horizontal Situation Indicator (HSI) module as claimed in claim 9 wherein the HSI module is further for outputting the Heading Error to the Flight Director display.

11. The improved Horizontal Situation Indicator (HSI) module as claimed in claim 9 wherein a Bank Angle Command is generated by the aircraft's GPS Flight module and the HSI module uses the Bank Angle Command to determine the heading error.

12. The improved Horizontal Situation Indicator (HSI) module as claimed in claim 9 wherein waypoint data is generated by the aircraft's GPS Flight module and the HSI module uses the waypoint data to determine the heading error.

13. The improved Horizontal Situation Indicator (HSI) module as claimed in claim 12 wherein the waypoint data includes flyby waypoint data.

14. The improved Horizontal Situation Indicator (HSI) module as claimed in claim 12 wherein the waypoint data includes flyover waypoint data.

* * * * *